(12) United States Patent
Nagai

(10) Patent No.: US 12,405,255 B2
(45) Date of Patent: Sep. 2, 2025

(54) DETECTOR FOR LIQUID CHROMATOGRAPH

(71) Applicant: SHIMADZU CORPORATION, Kyoto (JP)

(72) Inventor: Yusuke Nagai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 321 days.

(21) Appl. No.: 17/630,125

(22) PCT Filed: Aug. 5, 2019

(86) PCT No.: PCT/JP2019/030761
§ 371 (c)(1),
(2) Date: Jan. 25, 2022

(87) PCT Pub. No.: WO2021/024360
PCT Pub. Date: Feb. 11, 2021

(65) Prior Publication Data
US 2022/0260535 A1 Aug. 18, 2022

(51) Int. Cl.
*G01N 30/74* (2006.01)
*G01N 30/02* (2006.01)

(52) U.S. Cl.
CPC ....... *G01N 30/74* (2013.01); *G01N 2030/027* (2013.01)

(58) Field of Classification Search
CPC ............ G01N 30/74; G01N 2030/027; G01N 2030/746; G01N 21/05
(Continued)

(56) References Cited

U.S. PATENT DOCUMENTS 5,153,679 A * 10/1992 Gilby ............... G01N 21/05
356/440
5,305,073 A * 4/1994 Ford, Jr. ............ G01N 21/49
356/338

(Continued)

FOREIGN PATENT DOCUMENTS

CN  103630638 A  3/2014
JP  63-198867 A  8/1988
(Continued)

OTHER PUBLICATIONS

Notice of Reasons for Refusal in corresponding Japanese Patent Application No. 2021-538574, dated Oct. 18, 2022, with English machine translation.
(Continued)

*Primary Examiner* — Marrit Eyassu
(74) *Attorney, Agent, or Firm* — Renner, Otto, Boisselle & Sklar, LLP

(57) ABSTRACT

A detector for liquid chromatograph includes a light source, a flow cell that includes a linear capillary, a holding member that holds one end portion of the capillary, an entrance port for allowing light to enter one end of the capillary, and an emission port for allowing light to be emitted from another end of the capillary, a condensing mirror for guiding light from the light source to the entrance port, and a light receiver for detecting the light emitted from the emission port, a lens is provided between the one end of the capillary and the condensing mirror, and the lens is arranged so as to parallelize light in a center region around an optical axis among light directed to the one end of the capillary from the condensing mirror and distance a first reflection position of the light in the center region from the one end.

6 Claims, 4 Drawing Sheets

(58) Field of Classification Search
USPC .................................................. 73/61.58
See application file for complete search history.

(56) References Cited

U.S. PATENT DOCUMENTS

| | | | | |
|---|---|---|---|---|
| 6,064,488 A | * | 5/2000 | Brand | ................ G01N 21/8507 |
| | | | | 356/440 |
| 8,086,083 B2 | | 12/2011 | Mueller | |
| 2010/0327184 A1 | * | 12/2010 | Hayashi | ............ G01N 21/0303 |
| | | | | 250/459.1 |
| 2014/0055782 A1 | * | 2/2014 | Hatahori | ............ G01N 21/0303 |
| | | | | 356/246 |
| 2014/0063494 A1 | * | 3/2014 | Hatahori | ................ G01N 21/05 |
| | | | | 356/246 |
| 2018/0238845 A1 | * | 8/2018 | Eliason | ................ G01N 21/255 |

FOREIGN PATENT DOCUMENTS

| | | | | | |
|---|---|---|---|---|---|
| JP | S63198867 A | * | 8/1988 | | |
| JP | 03-179240 A | | 8/1991 | | |
| JP | H09101260 A | * | 4/1997 | | |
| JP | 3176582 U | * | 6/2012 | | |
| JP | 2014-041024 A | | 3/2014 | | |
| JP | 2014095601 A | * | 5/2014 | ............ | G01J 1/0411 |

OTHER PUBLICATIONS

International Search Report with respect to International Patent Application No. PCT/JP2019/030761, mailed Oct. 29, 2019.
Written Opinion of the International Searching Authority with respect to International Patent Application No. PCT/JP2019/030761, mailed Oct. 29, 2019 (English Machine Translation).
Office Action in corresponding Chinese Patent Application No. 201980098781.3 dated Mar. 4, 2024, with English machine translation.
Office Action in corresponding Chinese Patent Application No. 201980098781.3 dated Oct. 30, 2024, with English machine translation.

* cited by examiner

DETECTOR FOR LIQUID CHROMATOGRAPH

TECHNICAL FIELD

The present invention relates to a detector for liquid chromatograph.

BACKGROUND ART

In a liquid chromatograph, it is important to reduce capacity of a system and reduce diffusion in order to analyze a rare sample with high sensitivity and at high speed. Thus, an inner diameter of a flow path through which a sample flows is preferably reduced as small as possible also in a detector. In a general flow cell being used in a detector such as an absorbance detector, a flow path through which a sample flows is provided within a block composed of a material having chemical resistance such as SUS316. In such a block-type flow cell, as the inner diameter of the flow path within the cell is decreased, a cross-sectional area of a flow path through which light passes is decreased, and further, a frequency at which light scatters on a wall surface of the cell is also increased. As a result, an S/N ratio is deteriorated.

As such, a flow cell in which a flow path through which a sample flows is constituted by a linear fine capillary (referred also to a light guide cell) can be used in order to achieve smaller capacity and lower diffusion (See Patent Document 1). In the light guide cell disclosed in Patent Document 1, light that has entered one end of the capillary is totally reflected at an interface between an outer peripheral wall surface of the capillary and an air layer surrounding the outer peripheral wall surface of the capillary and is then propagated to another end of the capillary.

CITATION LIST

Patent Document

[Patent Document 1] JP 2014-041024 A
[Patent Document 2] United States Patent Specification No. 8086083 B2

SUMMARY OF INVENTION

Technical Problem

In the light guide cell as described above, both ends of the capillary are held by a holding member such as a ferrule. Light incident on the light guide cell is also incident on an interface between the capillary and the holding member. A reflectance of a light guide composed of the capillary and a sample flowing within the capillary is changed due to a refractive index difference between the sample flowing within the capillary and the holding member that is in contact with the capillary. If a refractive index of the sample is constant, there is no problem; however, in a gradient analysis in which a composition of a mobile phase is chronologically changed, the refractive index of the sample flowing in the capillary is chronologically changed and, therefore, the amount of light emitted from the capillary is chronologically changed, and a baseline of a detector signal fluctuates. Such a phenomenon is referred to as a photorefractive effect.

An object of the present invention is to suppress the fluctuation of the baseline due to the photorefractive effect.

Solution to Problem

A detector for liquid chromatograph according to the present invention includes: a light source; a flow cell that includes a linear capillary that delimits a flow path for allowing a sample liquid to flow through, a holding member that holds one end portion of the capillary, an entrance port for allowing light to enter one end of the capillary, and an emission port for allowing light to be emitted from another end of the capillary; a condensing mirror for guiding light from the light source to the entrance port of the flow cell; and a light receiver for detecting the light emitted from the emission port of the flow cell, wherein a lens is provided between the one end of the capillary of the flow cell and the condensing mirror, and the lens is arranged so as to parallelize light in a center region around an optical axis among light directed to the one end of the capillary from the condensing mirror and distance a first reflection position of the light in the center region from the one end.

Here, "parallelizing" means refracting the light to reduce an inclination angle to the optical axis. Also, "a first reflection position of the light that has entered the capillary" refers to a position at which the light that has entered the capillary is first incident on an interface between an outer peripheral surface of the capillary and an air layer and is then reflected. In the present invention, the first reflection position of the light in the center region around the optical axis among the light directed to the one end of the capillary from the condensing mirror is distanced from the one end of the capillary, so that the amount of light incident on an interface between the outer peripheral surface of the capillary and the holding member is reduced.

Advantageous Effects of Invention

With the detector for liquid chromatograph of the present invention, the lens is provided between the one end of the capillary of the flow cell and the condensing mirror, and the lens is arranged such that the first reflection position of the light in the center region around the optical axis among the light directed to the one end of the capillary from the condensing mirror is distanced from the one end of the capillary; therefore, the amount of light incident on the interface between the outer peripheral surface of the capillary and the holding member is reduced, and the fluctuation of the baseline of the detector signal during the gradient analysis is suppressed.

DESCRIPTION OF EMBODIMENTS

One inventive example of a detector for liquid chromatograph will be described below with reference to the drawings.

Figure 1:
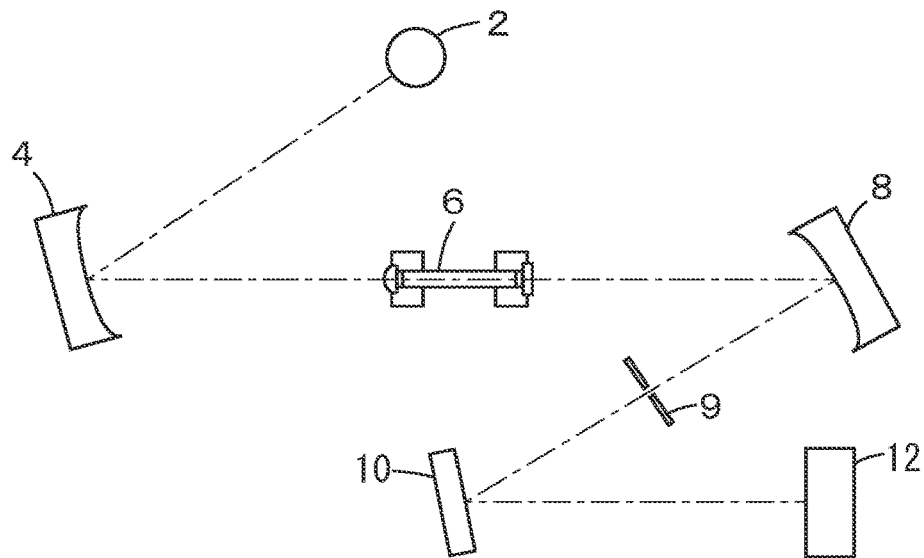
FIG. 1 A schematic configuration diagram showing one inventive example of a detector for liquid chromatograph.

As shown in FIG. 1, the detector for liquid chromatograph of this inventive example includes a light source 2, a condensing mirror 4, a flow cell 6, a mirror 8, a grating 10, and a light receiver 12.

Figure 2:
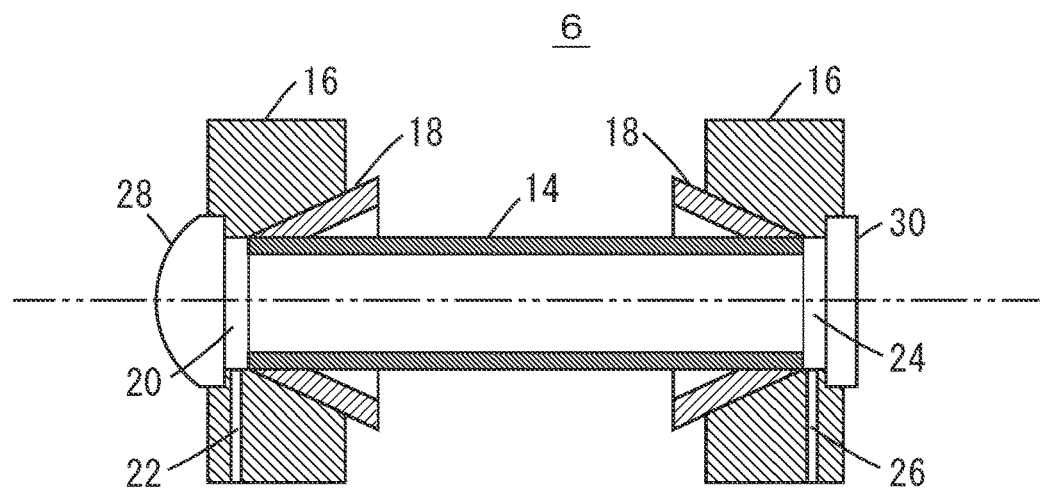
FIG. 2 A schematic cross sectional view showing a structure of a flow cell of the inventive example.

Light emitted from the light source 2 is reflected on the condensing mirror 4 and condensed at an entrance port 20 of the flow cell 6 (See FIG. 2). The flow cell 6 is a light guide cell having a flow path through which a sample liquid flows is constituted by a linear capillary (See FIG. 2). A positional relationship between the condensing mirror 4 and the flow cell 6 is set such that an optical axis of the light reflected on the condensing mirror 4 and a central axis of the capillary 14 of the flow cell 6 coincide with each other.

The light that has entered the entrance port of the flow cell 6 passes through within the capillary 14 and is emitted from an emission port 24 (See FIG. 2). The light emitted from the flow cell 6 is reflected on the mirror 8, passes through a slit 9, is guided to the grating 10, and then decomposed into each wavelength component. The light of each wavelength component decomposed at the grating 10 enters the light receiver 12 constituted by a photodiode array, for example, and an intensity of the light in each wavelength region is measured.

A structure of the flow cell 6 will be explained using FIG. 2.

The flow cell 6 includes the capillary 14, a casing 16, a holding member 18, a lens 28, and a window plate 30. The capillary 14 is composed of quartz glass or the like and has an outer diameter of 0.5 mm, for example. Both ends of the capillary 14 are held by the holding member 18 such as ferrule and are attached to the casing 16. An outer peripheral surface of the capillary 14 is in contact with an air layer except for the both ends being in contact with the holding member 18. The light that has entered the capillary 14 from one end of the capillary 14 (a left end in FIG. 2) travels within the capillary 14 to another end (a right end in FIG. 2) while repeating total reflection at an interface between the outer peripheral surface of the capillary 14 and the air layer surrounding the outer peripheral surface.

The entrance port 20, an introduction flow path 22, the emission port 24, and a lead-out flow path 26 are provided in the casing 16. The entrance port 20 is an opening for allowing light to be incident on the one end of the capillary 14, and the emission port 24 is an opening for allowing light emitted from the other end of the capillary 14 to be extracted. The introduction flow path 22 is a flow path for allowing sample water to be introduced to the one end of the capillary 14, and the lead-out flow path 24 is a flow path for allowing the sample water that has passed through the capillary 14 to be led outside. The entrance port 20 is sealed by the lens 28, and the emission port 24 is sealed by the plate-shaped window plate 30. Note that an optical fiber may be inserted into the emission port 24 to allow the light from the other end to be emitted via the optical fiber.

Figure 3:
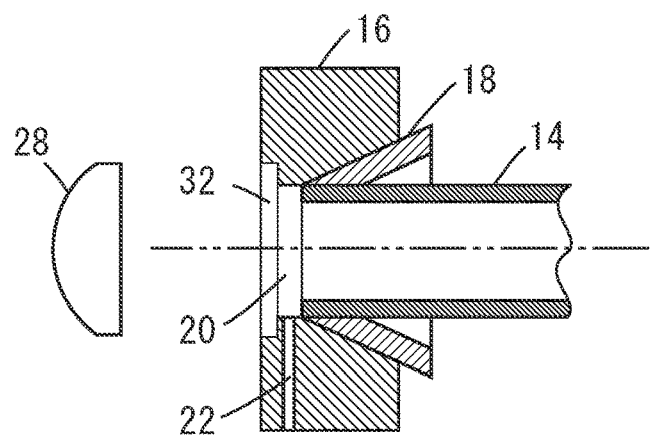
FIG. 3 A partially exploded cross sectional view for explaining a structure of a lens attachment portion of the flow cell of the inventive example.

The lens 28 that seals the entrance port 20 is attached to be fitted in a dent 32 provided at an edge of the entrance port 20 of the casing 16 as shown in FIG. 3. The dent 32 is provided to share a central axis with the capillary 14. An outer diameter of the lens 28 is substantially identical to an inner diameter of the dent 32, i.e., the difference between the outer diameter of the lens 28 and the inner diameter of the dent 32 is 1.13% or less of the outer diameter of the lens 28. Thus, the center of the lens 28 fitted in the dent 32 is positioned on the central axis of the capillary 14.

In this inventive example, the lens 28 is a convex lens that has a convex surface directed to the condensing mirror 4. As one example of the dimension of the lens 28, the outer diameter is 6 mm, a lens diameter is 4 mm, and a thickness is 2.3 mm. The lens 28 has a planar surface opposite to the convex surface and has a side surface perpendicular to the planar surface. Since the lens 28 has such a side surface, the lens 28 is stably held by the dent 32 when fitted in the dent 32.

The lens 28 is positioned between the condensing mirror 4 and the one end of the capillary 14 to parallelize light in a center region around the optical axis among light directed from the condensing mirror 4 to the one end of the capillary 14. The parallelizing here means reducing an inclination angle to the optical axis. The center region is, for example, a region of 20% closer to the center of a flux of light, which is reflected on the condensing mirror 4.

Figure 4:
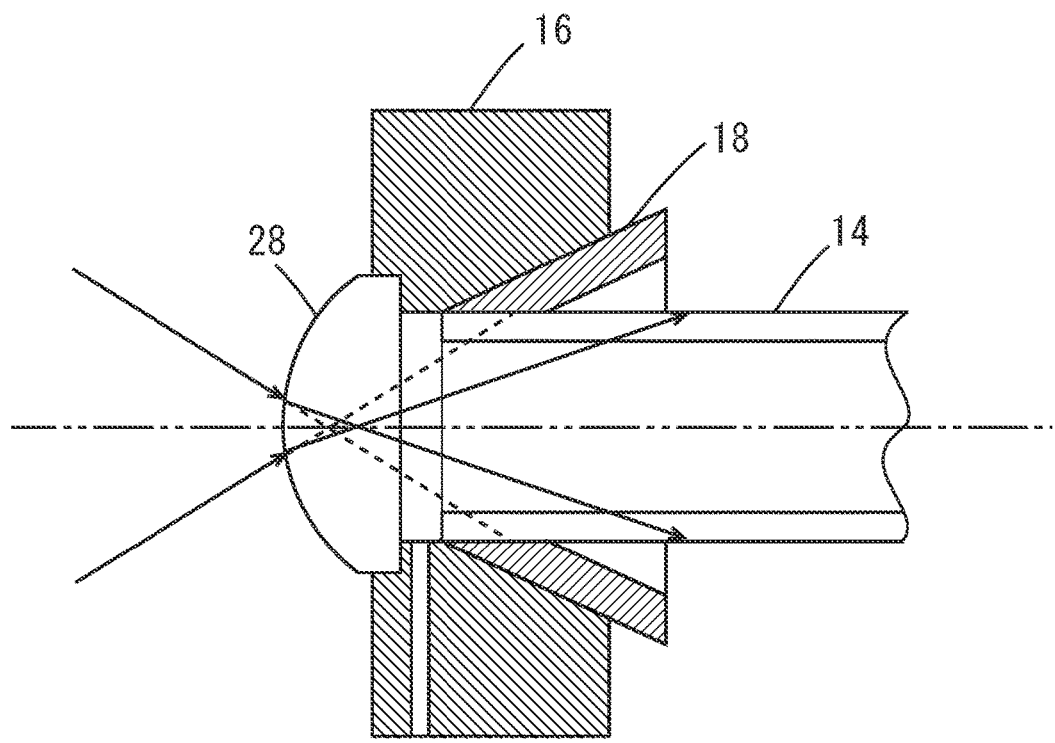
FIG. 4 A conceptual diagram for explaining an effect caused by a lens of the flow cell of the inventive example.

As shown in FIG. 4, if the lens 28 that has the center on the optical axis of the light from the condensing mirror 4 is arranged, the light in the center region is refracted at the lens 28 and is parallelized. Therefore, a position where the light is initially reflected within the capillary 14 (a first reflection position) is shifted to a position that is distant from the one end of the capillary 14 in comparison with a case where there is no lens 28. As such, the light in the center region among the light from the condensing mirror 4 is unlikely to be incident on an interface between the outer peripheral surface of the capillary 14 and the holding member 18, and total reflection efficiency within the capillary 14 is improved.

On the other hand, it is also considered that light in an outer region distant from the center among the light from the condensing mirror 4 is refracted at the lens 28, and its inclination angle to the optical axis is increased, so that the light in the outer region is likely to be incident on the interface between the outer peripheral surface of the capillary 14 and the holding member 18, and thus, the total reflection efficiency within the capillary 14 is deteriorated. However, the light from the light source 2 has a distribution in which the light in and closer to the center region has a larger amount of light and, therefore, an influence exerted by the deterioration of the total reflection efficiency of the light in the outer region of the flux of light within the capillary 14 is smaller than an influence exerted by the improvement of the total reflection efficiency of the light in the center region of the flux of light within the capillary 14.

While the lens 28 is attached to the casing 16 and serves also as the window plate that seals an entrance port 20 in this inventive example, the present invention is not limited to this. The lens 28 only has to be provided to parallelize the light in the center region of the light from the condensing mirror 4 and to distance the first reflection position from the one end of the capillary 14, and the lens 28 may be provided separately from the flow cell 6.

Figure 5:
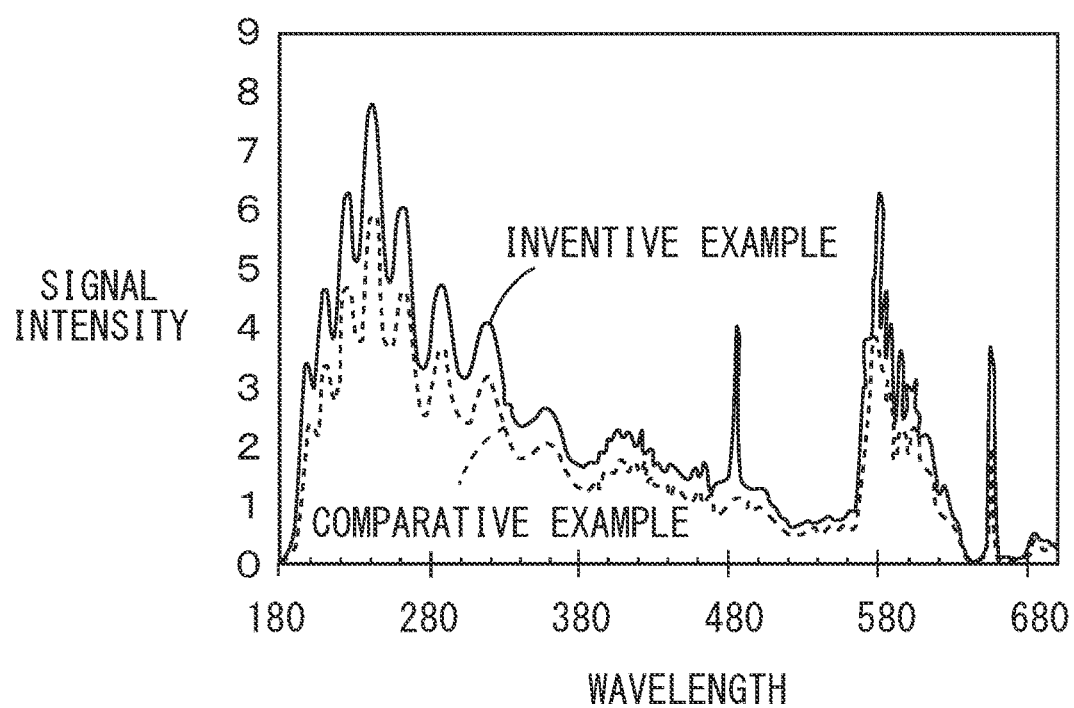
FIG. 5 Validation data of an influence of the lens of the inventive example exerted on light transmission efficiency.

FIG. 5 is measurement data showing a validation result of an influence of the lens 28 exerted on light transmission efficiency of the flow cell 6.

In this validation, the amount of light in each wavelength region detected by the light receiver 12 was measured while water was flowed within the capillary 14 of the flow cell 6. In FIG. 5, an inventive example (solid line) is measurement data obtained using the above-described flow cell 6, and a comparative example (dashed line) is measurement data obtained using a flow cell in which a plate-shaped window plate in place of the lens 28 is attached to the entrance port 20.

It was found from this validation that the inventive example (solid line) showed a larger amount of light in each wavelength region detected by the light receiver 12 than the comparative example (dashed line). That is, it was shown that the lens 28 was provided between the condensing mirror 4 and the capillary 14 to parallelize the light in the center region of the light incident on the capillary 14, so that the total reflection efficiency within the capillary 14 was improved and the amount of the light transmitting through the flow cell 6 was increased.

Figure 6:
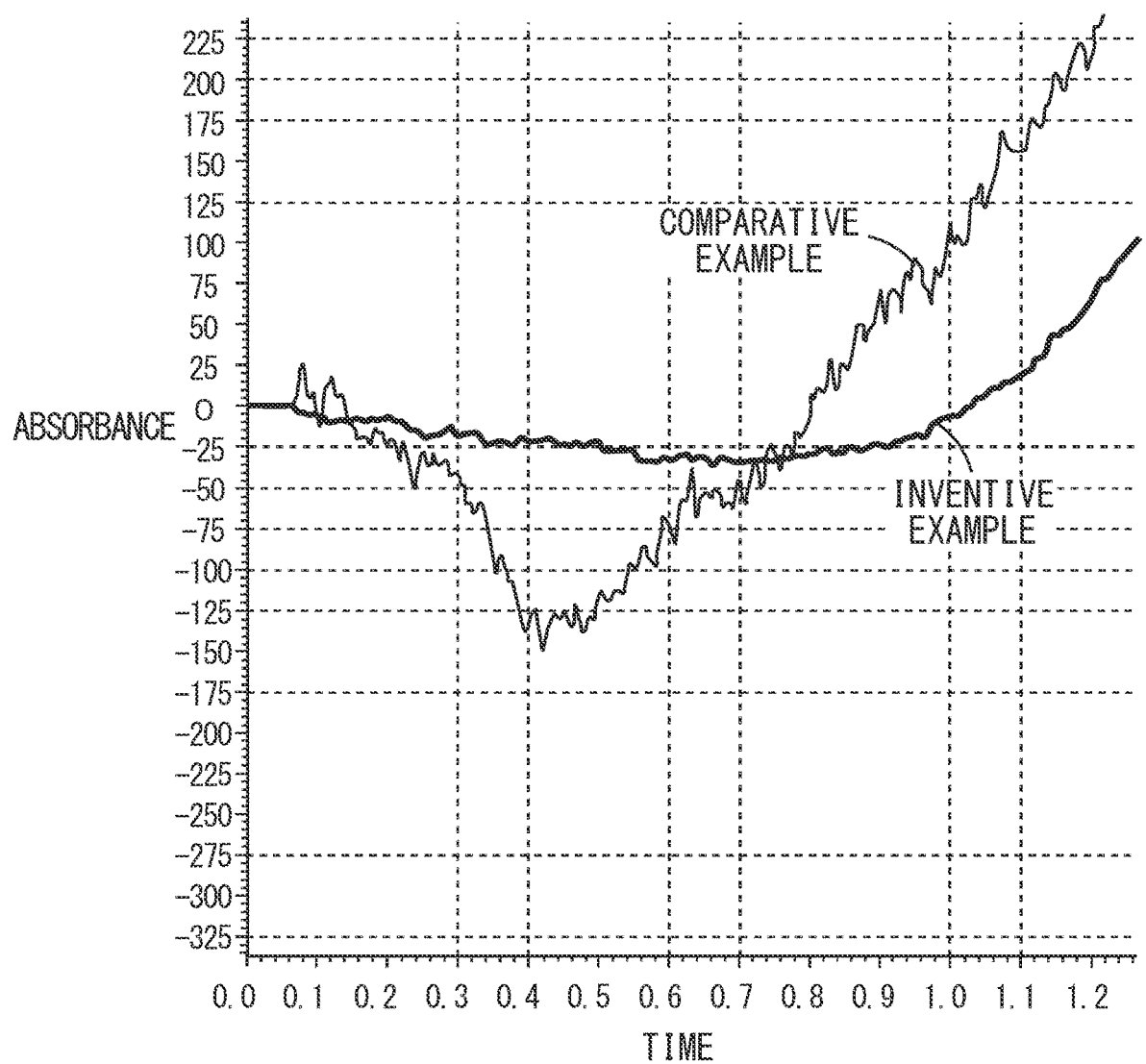
FIG. 6 First validation data of an influence of the lens of the inventive example exerted on a photorefractive effect.
Figure 7:
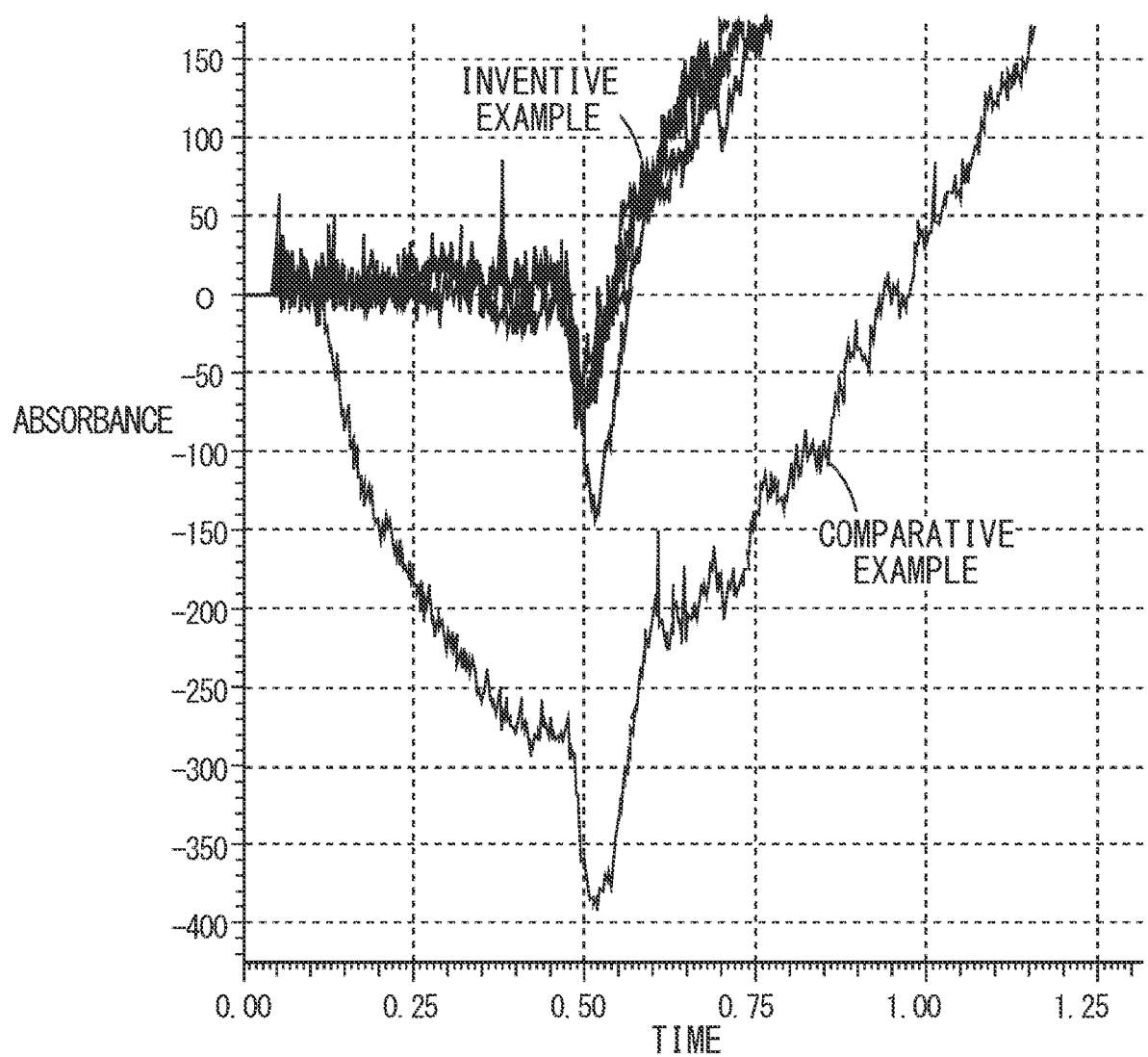
FIG. 7 Second validation data of the influence of the lens of the inventive example exerted on the photorefractive effect.

FIGS. 6 and 7 are measurement data showing validation results of an influence of the lens 28 exerted on a photorefractive effect. Similarly to FIG. 5, the inventive example is measurement data obtained using the flow cell 6 including the lens 28, and the comparative example is measurement data obtained using the flow cell in which the plate-shaped window plate in place of the lens 28 is attached to the entrance port 20.

In the validation of FIG. 6, a mobile phase was flowed at a flow rate of 0.8 mL/min within the capillary 14 (an inner diameter of 0.36 mm) of the flow cell 6, and a composition of the mobile phase was varied such as a liquid A (water):a liquid B (acetonitrile)=100:0, 95:5, 0:100, and 100:0 in this order, and absorbance of light of a 250 nm wavelength was measured.

In the validation of FIG. 7, the mobile phase was flowed at the flow rate of 0.8 mL/min within the capillary 14 (the inner diameter of 0.36 mm) of the flow cell 6, and the composition of the mobile phase was varied such as a liquid A (water:acetonitrile:TFA=95:5:0.05):a liquid B (water:acetonitrile:TFA=5:95:0.05)=98:2, 0:100, and 98:2 in this order, and the absorbance of light of the 250 nm wavelength was measured.

In the both validation results of FIGS. 6 and 7, it was found that a baseline of the measurement data of the inventive example was more stable than that of the comparative example. That is, it was shown that the lens 28 was provided between the condensing mirror 4 and the capillary 14 to parallelize the light in the center region of the light incident on the capillary 14, so that the photorefractive effect was suppressed.

The inventive example as described above is merely one example of an embodiment of the detector for liquid chromatograph according to the present invention. The embodiment of the detector for liquid chromatograph according to the present invention is described below.

The embodiment of the detector for liquid chromatograph according to the present invention includes: a light source; a flow cell that includes a linear capillary that delimits a flow path for allowing a sample liquid to flow through, a holding member that holds one end portion of the capillary, an entrance port for allowing light to enter one end of the capillary, and an emission port for allowing light to be emitted from another end of the capillary; a condensing mirror for guiding light from the light source to the entrance port of the flow cell; and a light receiver for detecting the light emitted from the emission port of the flow cell, wherein a lens is provided between the one end of the capillary of the flow cell and the condensing mirror, and the lens is arranged so as to parallelize light in a center region around an optical axis among light directed to the one end of the capillary from the condensing mirror and distance a first reflection position of the light in the center region from the one end.

In a first aspect of the above-described embodiment, the flow cell includes a casing, the entrance port is provided in the casing, a circular dent that shares a central axis with the capillary is provided at an edge of the entrance port of the casing, an outer diameter of the lens is substantially identical to an inner diameter of the dent, and with the lens fitted in the dent, a center of the lens is positioned on the central axis of the capillary. It is important to bring a positional relationship among the condensing mirror, the capillary, and the lens closer to a designed positional relationship in order to effectively achieve the suppression of the photorefractive effect by the lens. As implemented in this first aspect, if the dent is provided in the casing, which has a substantially constant positional relationship with the flow cell, and the lens is fitted in the dent, positioning of the lens with respect to the capillary is accurately and easily carried out, so that the suppression of the photorefractive effect by the lens can be effectively achieved.

In the above-described first aspect, the flow cell can be arranged such that the optical axis of the light reflected on the condensing mirror coincides with the central axis of the capillary. Such a positional relationship facilitates a design of the lens such as its size, shape, and position for suppressing the photorefractive effect.

In a second aspect of the above-described embodiment, the lens is a convex lens that has a convex surface directed to the condensing mirror.

REFERENCE SIGNS LIST

2 Light source
4 Condensing mirror
6 Low cell
8 Mirror
10 Grating
12 Light receiver
14 Capillary
16 Casing
18 Holding member
20 Entrance port
22 Introduction flow path
24 Emission port
26 Lead-out flow path
28 Lens
30 Window plate
32 Dent

The invention claimed is:

1. A detector for liquid chromatograph comprising:
   a light source;
   a flow cell that includes:
      a casing,
      a linear capillary that delimits a flow path for allowing a sample liquid to flow through,
      a holding member that holds one end portion of the capillary relative to the casing,
      an entrance port in the casing for allowing light to enter one end of the capillary, and
      an emission port in he casing for allowing light to be emitted from another end of the capillary;
   a condensing mirror for guiding light from the light source to the entrance port of the flow cell; and
   a light receiver for detecting the light emitted from the emission port of the flow cell,
   a lens provided at the entrance port of the flow cell, such that the guided light is incident on the lens, wherein the lens includes:

a convex surface;
a planar surface opposite the convex surface; and
a side surface perpendicular to the planar surface;
wherein the lens is held relative to the casing via the side surface of the lens, such that the planar surface of the lens seals the entrance portion of the casing;
wherein the light incident on the lens is non-parallelized and is received by the convex surface of the lens;
wherein the lens is arranged so as to parallelize light in a center region around an optical axis among light directed to the one end of the capillary from the condensing mirror and distance a first reflection position of the light in the center region farther from the one end than a portion held by the holding member, such that an amount of light incident on an interface between an outer peripheral surface of the capillary and the holding member is reduced, and total reflection efficiency within the capillary is improved; and
wherein the lens parallelizes the non-parallelized light by reducing an inclination angle to the optical axis.

2. The detector for liquid chromatograph according to claim 1, wherein a circular dent that shares a central axis with the capillary is provided at an edge of the entrance port of the casing, an outer diameter of the lens is substantially identical to an inner diameter of the dent, and with the lens fitted in the dent, a center of the lens is positioned on the central axis of the capillary.

3. The detector for liquid chromatograph according to claim 2, wherein the flow cell is arranged such that the optical axis of the light reflected on the condensing mirror coincides with the central axis of the capillary.

4. The detector for liquid chromatograph according to claim 1, wherein the convex surface of the lens is directed to the condensing mirror.

5. The detector for liquid chromatograph according to claim 1, wherein a plurality of types of liquids are combined, and a mobile phase in which the combinations of the liquids are chronologically changed is flowed through the flow path.

6. A detector for liquid chromatograph comprising:
a light source;
a flow cell that includes:
   a casing,
   a linear capillary that delimits a flow path for allowing a sample liquid to flow through,
   a holding member that holds one end portion of the capillary relative to the casing,
   an entrance port in the casing for allowing light to enter one end of the capillary, and
   an emission port in the casing for allowing light to be emitted from another end of the capillary;
a condensing mirror for guiding light from the light source to the entrance port of the flow cell; and
a light receiver for detecting the light emitted from the emission port of the flow cell,
a lens provided at the entrance port of the flow cell, such that the guided light is incident on the lens, wherein the lens includes:
   a convex surface;
   a planar surface opposite the convex surface; and
   a side surface perpendicular to the planar surface;
wherein the lens is held relative to the casing via the side surface of the lens such that the planar surface of the lens seals the entrance portion of the casing;
wherein the light incident on the lens is non-parallelized and is received by the convex surface of the lens;
wherein the lens is arranged so as to parallelize the non-parallelized light in a center region around an optical axis and distance a first reflection position of the light in the center region farther from the one end than a portion held by the holding member, such that the parallelized light is focused down the capillary and onto the detector to reduce light loss due to scattering.

* * * * *